United States Patent [19]

Chandler

[11] Patent Number: 4,753,073
[45] Date of Patent: Jun. 28, 1988

[54] STIRLING CYCLE ROTARY ENGINE

[76] Inventor: Joseph A. Chandler, 3030 Longwood La., Dickinson, Tex. 77539

[21] Appl. No.: 110,320

[22] Filed: Oct. 20, 1987

[51] Int. Cl.$^4$ .............................................. F02G 1/04
[52] U.S. Cl. ....................................... 60/519; 60/525
[58] Field of Search .................................. 60/519, 525

[56] References Cited

U.S. PATENT DOCUMENTS 3,460,344  8/1969  Johnson ................................ 60/519
4,312,181  1/1982  Clark ..................................... 60/519

Primary Examiner—Allen M. Ostrager
Attorney, Agent, or Firm—Edward K. Fein; John R. Manning; Russell E. Schlorff

[57] ABSTRACT

An improved rotary engine (10) utilizing essentially the Stirling cycle is provided having at least three rotors (12, 34, 56) each separately rotatable within a toroidal housing cavity (15) and about a common axis. Each rotor has a pair of diametrically opposed rotor blocks, so that at least six cylindrical working chambers are formed sufficient to accomodate the Stirling cycle. Heat may be added to the closed circuit engine gas via a heat exchanger (74) thermally connected to any heat source external to the working chambers, such as a solar collector, thus rendering the high efficiency engine suitable for outer space applications. A cool compressed gas from one working chamber and a hot exhaust gas from another working chamber pass through respective thermally connected heat exchangers (72, 80) for conservation of energy and increased engine efficiency. Relative angular rotor movement and thus phased volume changes in the working chambers may be obtained by an arrangement of meshing elliptical gears connected to multiple coaxial rotor shafts (24, 28, 32) and an aligned common output shaft (36).

14 Claims, 2 Drawing Sheets

STIRLING CYCLE ROTARY ENGINE

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

The present invention relates to rotary engines and, more particularly, to an improved rotary engine for generating mechanical power from heat energy and having at least six working chambers to accomodate the highly efficient Stirling cycle.

DESCRIPTION OF THE PRIOR ART

Engines having one or more rotational rotors are known to have numerous theoretical advantages over conventional engines utilizing linearly reciprocating pistons. Such advantages include smoother operation and improved engine balancing, less moving parts, lower frictional losses, and reduced size, weight, and cost. Most rotary engines also suffer, however, from one or more significant disadvantages which have severely limited their commercial acceptance. The type of rotary engine most commonly produced at this time utilizes an Otto cycle and an eccentric rotor, which significantly increases the complexity and manufacturing costs of the engine. Other rotary engines utilize (a) a complex arrangement of planetary gears and cranks to operate connecting arms, (b) multiple crankshafts, or (c) sophisticated rombic drives, thereby making the engine difficult to balance and expensive to manufacture.

Most engine designs are based directly on or are a slight variant of either the Ericsson cycle, the Stirling cycle, or the Otto cycle. An analysis of the thermodynamics of these engine cycles reveals that the Ericsson cycle theoretically provides the most work. The high volumetric displacement required for the constant pressure heating and cooling of this cycle, however, significantly increases the size of the engine and thus limits the practicality of utilizing this cycle for most applications.

The Otto cycle achieves adiabatic compression and expansion, and constant volume heating and cooling. Rotary engines based upon the Otto cycle and having complex gearing mechanisms are disclosed in U.S. Pat. Nos. 3,430,573, 3,439,549, 3,595,014, 3,873,247 and 4,086,985. A "reversing blade" type of rotary engine is disclosed in U.S. Pat. No. 3,397,760, and a rotary engine with wedge-shaped pistons is the subject of U.S. Pat. No. 4,010,716.

The Otto cycle is well suited for engines in which combustion of a fuel occurs within an internal working chamber of the engine. The efficiency of the Otto cycle internal combustion engine is limited, however, by the temperature of the incoming gas. The efficiency of an engine utilizing the Otto cycle cannot, however, be continually increased by raising the temperature of the incoming gas, since gas temperature must be kept sufficiently low in order to prevent detonation (knocking) which severely detracts from engine performance.

The theoretical Stirling cycle achieves isothermal compression and expansion, with constant volume heating and cooling. This cycle has the advantage of theoretically increased efficiency over the Otto cycle, yet an engine utilizing this cycle does not require the substantially increased size and complexity of an Ericsson cycle engine. The benefits of the Stirling cycle have been widely known, and accordingly developments continue with respect to non-rotary Stirling cycle engines, as disclosed in U.S. Pat. Nos. 3,852,961, 4,026,114, and 4,382, 362.

Rotary engines based upon the Stirling cycle are disclosed in U.S. Pat. Nos. 3,370,418, 3,492,818, 3,537,256, 3,958,421, and 4,044,559. These latter disclosures, although seeking to combine the benefits of high efficiency for the Stirling cycle with the advantages of a rotary engine, utilize an offset axis for the rotor shaft and thus require displacer rotor vanes which move radially to maintain sealing integrity with the outer housing wall. The complexity, wear, and increased balancing problems created by this offset axis arrangement thus substantially detract from the previously disclosed benefits of a rotary engine.

The disadvantages of the prior art are overcome by the present invention, and an improved rotary engine utilizing essentially the Stirling cycle is hereinafter disclosed which more fully combines the benefits of a Stirling cycle with the benefits and advantages of a rotary engine.

SUMMARY OF THE INVENTION

A highly efficient, reliable, and lightweight rotary engine utilizing essentially the Stirling cycle is provided. Useful work is obtained utilizing any heat source external to the varying volume chambers of the engine, and accordingly the versatile engine is well-suited for both terrestrial and outer space applications where maximum engine efficiency, reliability, and smoothness of operation coupled with a minimum engine size, weight, and complexity are preferred.

The rotary engine of the present invention comprises a rotor housing defining a toroidal cavity having a central axis, and at least three rotors each independently rotatable within the toroidal cavity about a common rotor axis aligned with the central housing axis. Each rotor has a pair of radially opposing blocks or pistons secured to a respective rotor shaft, thereby forming at least six engine gas working chambers between the circumferentially spaced blocks. Proper phased movement of each rotor and thus variance in the volume of each working chamber may be controlled by an elliptical gear arrangement.

The rotary engine of the present invention includes a pair of thermally interconnected heat exchangers for removing heat from the hot exhaust gas and adding heat to the relatively cool compressed gas. Another heat exchanger is provided for adding additional heat to the compressed gas from the heat source external to the engine. A cool compressed gas outlet port in the rotor housing is in series with a first heat exchanger for supplying engine exhaust heat to the gas, a second heat exchanger for adding external heat to the gas, and a heated compressed gas inlet port back to the engine cavity. A hot exhaust gas outlet port in the rotor housing is in series with a third heat exchanger for removing heat from the exhausted gas to be supplied to the first heat exchanger. A fourth heat exchanger, in series with the third, rejects unusable heat to a heat sink and supplies the cooled gas to the gas inlet port and thus back to the engine cavity. A suitable Stirling cycle gas, such as helium, thus continually circulates in one direction in a closed-loop system between the heat exchangers and the engine cavity.

The external heat source may be a solar collector, a nuclear reactor, a geothermal source, or a combustion-type furnace. The engine of the present invention may thus be easily adapted to efficiently generate mechanical power from any number of heat sources. The versatile engine of the present invention is well suited for both terrestrial and outerspace applications.

It is an object of this invention to provide an improved rotary engine utilizing essentially the Stirling cycle. Engine complexity and thus manufacturing costs are minimized by providing independently movable rotors each rotatable about an axis aligned with the central axis of the rotor housing, and with the phase relationship of the rotors controlled by an elliptical gear arrangement. The efficiency of the engine is increased by passing the working gas in a closed loop through the first and third thermally connected heat exchangers. This thermal coupling of exhaust heat to the cooled compressed gas performs the function of the regenerator in the typical Stirling cycle engine. Using three rotors, six power pulses are obtained during each complete rotation of the output shaft.

Other advantages and features of this invention become apparent from the following detailed description, wherein reference is made to the figures in the accompanying drawings.

DETAILED DESCRIPTION OF PREFERRED EMBODIMENTS

Figure 1:
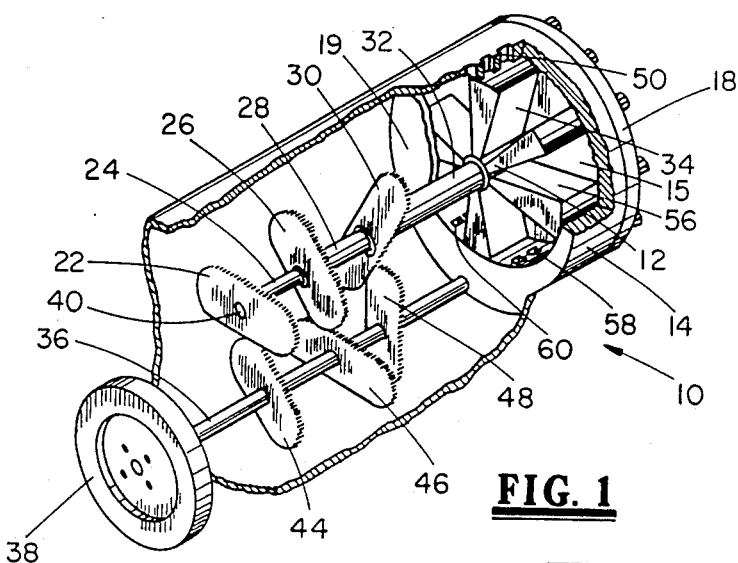
FIG. 1 is a simplified conceptual diagram of a Stirling cycle rotary engine according to the present invention.

FIG. 1 depicts a suitable embodiment of a Stirling cycle rotary engine 10 according to the present invention. An engine housing 14 defines a cylindrical cavity 15 for receiving at least three rotors 12, 34, and 56 each rotatable about a common axis 40 aligned with a central axis of the toroidal cavity. The removable back plate 18 cooperates with a front plate 19 so as to form a fluid-tight engine compartment. The engine compartment is thus defined by a cylindrical shaped perimeter housing wall and a pair of planar surfaces parallel to each other and perpendicular to both the housing wall and axis 40. The engine housing may be liquid or gas cooled in a conventional manner.

Each rotor is mounted on an independently rotatable shaft and, for exemplary purposes, rotor 12 is depicted fixedly on shaft 24, rotor 34 on shaft 28, and rotor 56 on shaft 32. Shaft 28 includes a central passageway for receiving shaft 24, and shaft 32 includes a central passageway for receiving shafts 24 and 28. Telescoping-type concentric shafts are thus provided so that each of the three rotors may independently rotate about a common axis in controlled relationship within the toroidal cavity of the engine housing.

Elliptical toothed gears 22, 26 and 30 are each respectively mounted on shafts 24, 28 and 32, and mesh with respective elliptical gears 44, 46 and 48 each mounted on a common output shaft 36. The major axis of each elliptical gear on the output shaft 36 is rotationally spaced from the major axis of its adjacent elliptical gears by 60°. The output shaft fixed gear relationship drives gears 22, 26, and 30 in a constantly varying phased relationship. If desired, a conventional flywheel 38 may be mounted to the output shaft 36 for achieving smoother operation and for coupling the engine to the device to be driven.

The elliptical gears of the present invention may be second order elliptical gears which produce controlled, predetermined angular movement of the rotors relative to each other. Each elliptical gear is mounted about its geometric center on its respective shaft, and continually intermeshes with another elliptical gear to provide the phased angular reciprocation of the rotors. Suitable second order elliptical gears provide a changing ratio of from 1.10:2.75 to 2.75:1.1. Third or higher order elliptical gears may also be used to achieve the desired controlled variation in the working chamber volumes within the engine cavity and between the rotors. The gears of the present invention may be of the type disclosed in U.S. Pat. No. 3,769,946, and more particularly the disclosure of that patent commencing at column 5, line 23 which is hereby incorporated by reference. According to the present invention, the center of mass of each gear does not move radially with respect to the axis of rotation for the gear, thus minimizing engine vibration.

It may be seen in FIG. 1 that the depicted rotors produce six working chambers with each working chamber being defined by the spacing between adjacent rotors blocks. According to the present invention, engine operation is based on a Stirling cycle, and at least six working chambers (and thus three rotors) are required. Additional rotors could be utilized, so that eight or more working chambers could be provided by four or more rotors.

Figure 2:
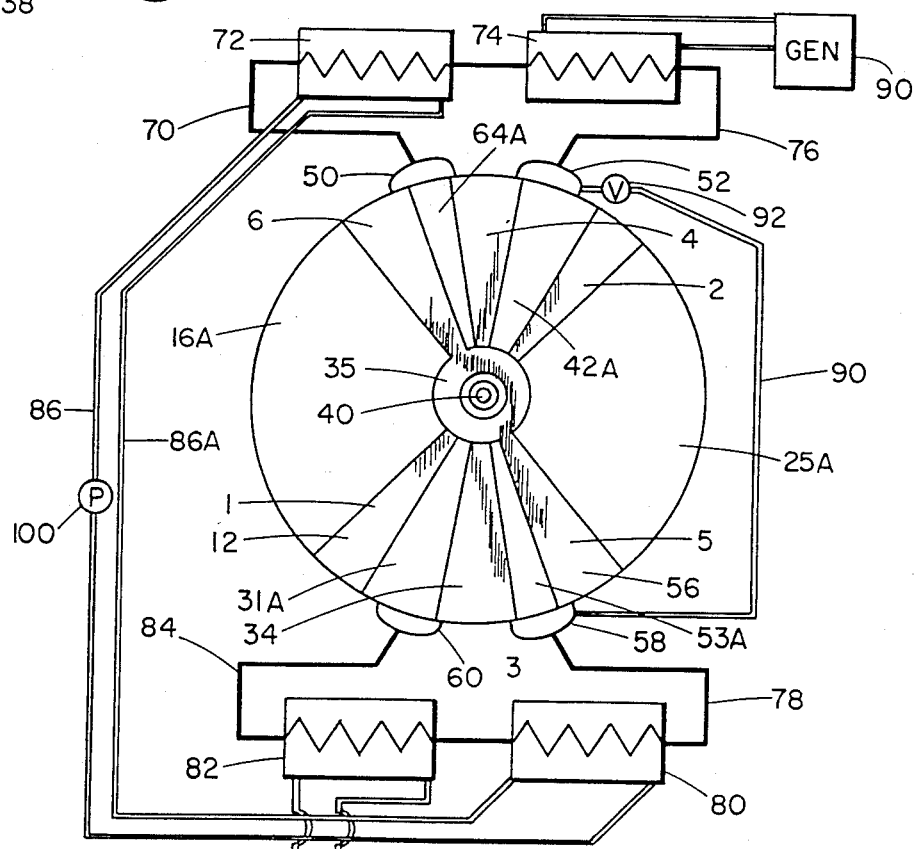
FIG. 2 is a simplified conceptual diagram of the engine shown in FIG. 1, illustrating a front view of the rotors and schematic fluid loops.

Referring now to FIG. 2, rotors 12 comprises two curved block segments 1 and 2 oppositely positioned about the axis 40 on its hub (not depicted). Each curved block segment is defined by arcuate inner and outer surfaces, by leading and trailing radial faces, and by parallel inboard and outboard faces each perpendicular to the axis 40. Each rotor block rotates in sealed relationship to the housing, and accordingly is provided with conventional sealing strips (not depicted). Rotor 34 similarly comprises curved block segments 3 and 4 oppositely positioned about axis 40 on its hub 35, and rotor 56 comprises curved block segments 5 and 6 oppositely positioned about axis 40. Two adjacent curved blocks thus define an engine working chamber which, as explained subsequently, is of a continually changing volume. As shown in FIG. 2, rotors 1 and 6 thus define chamber 16A, rotors 6 and 4 define chamber 64A, rotors 4 and 2 define chamber 42A, rotors 2 and 5 define chamber 25A, rotors 5 and 3 define chamber 53A, and rotors 3 and 1 define chamber 31A.

The toroidal engine compartment or cavity within the engine housing includes four ports 50, 52, 58 and 60 with ports 50, 58 and 60 being depicted in FIG. 1. Discharge port 50 is in series communication with heat exchangers 72 and 74 via flow line 70 and thence to port 52 via flow line 76. The heat source or generator 90 supplies heat to heat exchanger 74 and, as explained subsequently, provides the driving energy for engine operation. Exhaust port 58 is similarly in series communication with heat exchangers 80 and 82 via flow line 78 and thence to port 60 via flow line 84. Heat exchangers 80 and 72 are in thermal communication via fluid lines 86 and 86A, and serve to transfer heat from the hot exhaust gas to the relatively cool compressed gas, thereby increasing engine efficiency. It should be understood that each of the heat exchangers 72, 74, 80 and 82 may be mounted directly to the engine housing 14 as shown in FIG. 1, thereby substantially shortening or effectively eliminating the length of lines 70, 76, 78 and 84.

The operation of the engine will now be described with reference to FIGS. 2, 3, 4, 5, and 6, which depict exemplary positions of the rotors for one complete rotor revolution. The curved block segment numbering scheme and working chamber numbering scheme used in FIG. 2 will be used for FIGS. 3-6, with the chambers shown in FIG. 3 having the suffix "B", the chambers in FIG. 4 having the suffix "C", the chambers in FIG. 5 having the suffix "D", and the chambers in FIG. 6 having the suffix "E".

Referring again to FIG. 2, rotor 12 starts an intake stroke by pulling cool gas in from the heat rejection heat exchanger 82. During approximately 129° of rotation of rotor 12, rotor 34 rotates only approximately 36°, thereby closing the cool gas inlet port 60. During this intake portion, the rotors have thus moved from the position as shown in FIG. 2 to the position as shown in FIG. 3, and the "gas intake" stroke for working chamber 31A is thus complete.

Figure 3:
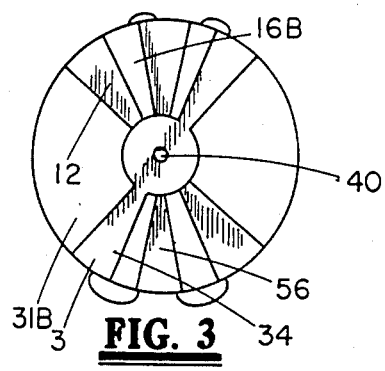
FIGS. 3, 4, 5, and 6 are front views of the rotors shown in FIG. 2 depicted in respective operational sequence.
Figure 4:
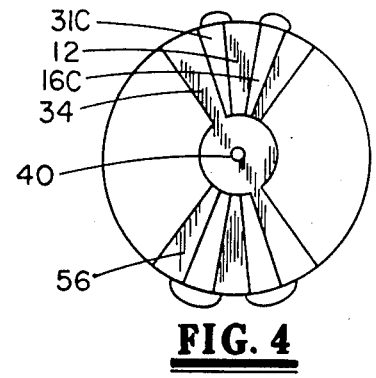
Figure 5:
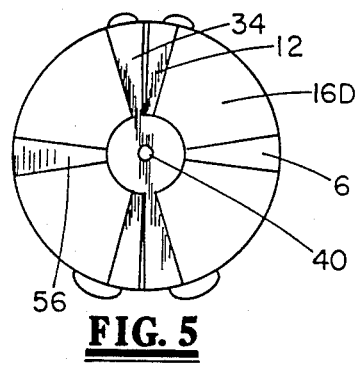
Figure 6:
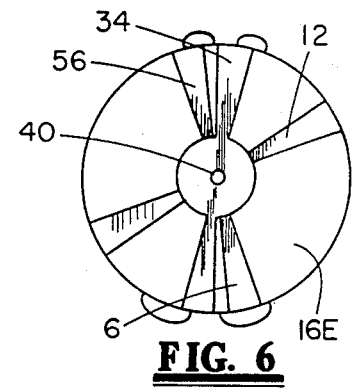

Movement of the rotors during the subsequent "gas compression" stroke are depicted by comparing FIGS. 3 and 4. Once chamber 31B is sealed from the cool gas inlet port 60 by the passing of block 3, rotor 34 starts the compression cycle by trapping the gas between blocks 3 and 1. Block 3 is moving rapidly at a high angular velocity with respect to block 1, and thus almost "catches up" to block 1 to achieve the position shown FIG. 4, thereby compressing the cool gas.

Rotor 12 is now in its low speed portion of its cycle, and rotor 34 forces the compressed gas through outlet port 50 as rotor 34 overtakes rotor 12. Rotor 34 thus forces virtually all the compressed gas from chamber 31C through the heat exchanger or regenerator 72 and the heat adding heat exchanger 74. Heat exchangers 72 and 74 are preferably low volume, high thermal efficiency units so that re-expansion of the compressed gas during this "gas heat" portion of the cycle is minimized, while feed through of high pressure gas back to the engine cavity via port 52 is maximized.

The gas is thus forced through the heat exchangers 72 and 74, passes through the heated compressed gas inlet port 52 and behind curved block 6 of rotor 56 to chamber 16C (see FIG. 4). Rotor 56 is now in the high rotational speed portion of its cycle while rotor 12 is still in the low speed portion of its cycle. Although the gas pressure force in chamber 16C exerted on curved block segments 1 and 6 is the same, the gear ratio advantage of rotor 56 at this stage causes rotor 56 to advance to the expanding gas and producing work while moving from the position shown in FIG. 4 to the position shown in FIG. 5. Although "negative work" is being done by rotor 12, the net work is the sum of forces times the distance of the positive and negative work. Rotor 56 will rotate approximately 120° while rotor 1 rotates only approximately 30°, thus producing a net positive power.

After rotor 56 rotates approximately 120°, curved block segment 6 opens the hot gas exhaust port 58 to chamber 16E, allowing the residual heat from the housed gas to be dumped to the regenerator or heat exchanger 80. Rotor 12 is now following rotor 56, and forces the hot gas out the exhaust port 58, so that rotors 12 and 56 return to the position shown in FIG. 2.

Each working chamber shown in FIGS. 2-6 in turn goes through the cycle described above. Cool gas is drawn in by expansion of a first working chamber, the gas is subsequently compressed, then the gas is heated by both regenerator or internal heat exchanger 72 and externally fed heat exchanger 74, the heated gas is then input to another chamber "ahead" of the first working chamber (producing work), the size of the second working chamber is then reduced forcing the gas through the regenerator or heat exchanger 30, and finally excess heat may be removed by heat exchanger 82 before the cool gas is again input to an engine working chamber. During each complete revolution, each of the six working chambers will thus expand and contract in volume two times. Six "power pulses" are thus achieved for a single revolution of output shaft 36.

The engine gas thus moves in one direction in a closed loop system through the working chambers of the engine cavity 15 and through the heat exchangers. Substantial heat from a suitable source external to the engine is added to the gas by heat exchanger 74, while internal engine heat is conserved by circulation of the exhaust gas through the heat exchanger 80, which in turn is thermally connected to heat exchanger 72 in fluid communication with the cool compressed gas. Heat exchanger 82 rejects unusable heat (typically to a radiator) prior to the compression cycle. The engine cycle is thus of a modified Stirling cycle, and high efficiency is achieved due to the regeneration benefit obtained by heat exchangers 80 and 72. Adiabatic compression and expansion will be approached in the engine, and very high compression ratios may be used with no concern for detonation since the heat source is external to the engine and fuel burning does not occur within the engine. A suitable inert gas, such as hydrogen or helium, may be used to provide desired thermal performance. The selection of the gas will normally depend on the operating temperature limits of the heat source and the environment in which the engine is to be placed.

Various techniques may be used with the engine of the present invention to throttle power output and thus balance the engine power with the imposed load. According to one embodiment as shown in FIG. 2, ports 52 and 58 may be connected with conduit 90 having throttling valve 92 positioned adjacent the port 52. With valve 92 open, no power would be generated, while maximum power would be generated when valve 92 is closed. Thus, varying positions of valve 92 produce varying output for the engine.

Figure 7:
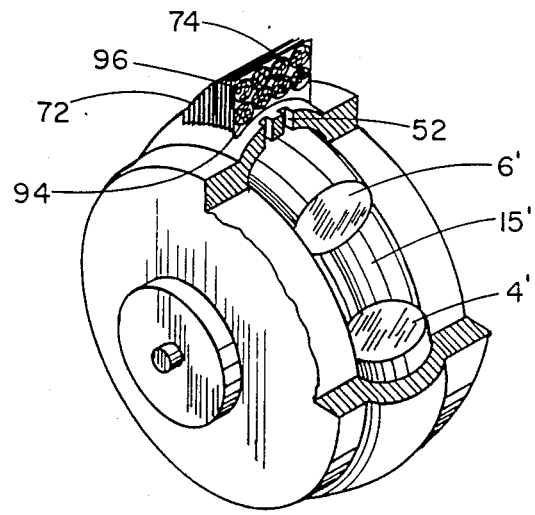
FIG. 7 is a simplified pictorial view, partially in cross-section, of another embodiment of the invention shown in FIG. 1.

FIG. 7 depicts an alternate embodiment of the invention described above. The toroidal engine cavity 15 accomodates at least 3 rotors, each of which is separately rotatable and has opposing blocks as described above. The rotor blocks have radial leading and trailing planar faces separated by a "curved" cylindrical-shaped surface. The rotor blocks $6^1$ and $4^1$ shown in FIG. 7 thus rotate in a toroidal "track" having a circular-shaped radial cross-sectional configuration. FIG. 7 also depicts heat exchangers 72, 74, 80 and 82 connected to the engine housing and in fluid communication with the working chambers by respective parts 50, 52, 58 and 60.

The heat exchanger 72, 74 and 80 each may be multiple-tube heat exchangers utilizing sintered copper balls 94 on the interior and fins 96 on the exterior (see FIG. 7). The engine gas will be directed through the interior of the heat exchanger while the exterior of the heat exchanger is heated with an appropriate fluid being pumped by a suitable pump 100 through lines 86 interconnecting heat exchangers 80 and 72, or from the heat source 90 to the heat exchanger 74. An appropriate fluid for the temperature being utilized will be selected for forming the fluid loop between the heat exchangers 72 and 80, and between generator 90 and heat exchanger 74. As previously indicated, the heat exchangers could be incorporated within the engine housing structure, or may be made separate from the engine and connected through the flow lines shown in FIG. 2.

The heat rejection heat exchanger 82 is preferably designed to accomodate a high volume of gas at a low velocity for achieving efficient elimination of excess heat. For outerspace applications, a suitable heat exchanger 82 may be of the type employing a large radiator with multiple pass tubes sized for the heat load.

By utilizing the regenerator concept of heat exchangers 72 and 80 interconnected by line 86, the efficiency of the theoretical Stirling cycle will be approached. The present invention thus offers high efficiency in an engine which utilizes rotary motion to produce an essentially vibration-free power system. The coaxially arranged rotors aligned with the axis of the engine cavity results in an engine with few moving parts thereby increasing reliability and reducing manufacturing costs.

The concepts of the present invention will be understood to be applicable to either an engine (for producing work) or to a pump (for moving fluid). The device may be easily adaptable for working with various fluids, such as steam, although the gas moving in a closed loop between the working chambers and the heat exchangers will preferably be an inert gas. Variations of the embodiments described will thus be understood by those skilled in the art, and such variations may be made without departing from the teachings and scope of this invention. Accordingly, it is intended that the scope of the invention be limited only by the claims which follow.

I claim:

1. A Stirling cycle rotary engine for producing mechanical energy from heat generated by a heat source external to the engine, the engine comprising:
   an engine housing having an interior toroidal cavity with a central housing axis for receiving a working gas, the engine housing further having a cool gas inlet port, a compressed gas outlet port, a heated compressed gas inlet port, and a hot exhaust gas outlet port;
   at least three rotors each fixedly mounted to a respective rotor shaft and independently rotatable within the toroidal cavity about the central axis;
   each of the rotors including a pair of rotor blocks spaced radially on diametrically opposing sides of the respective rotor shaft, each rotor block having a radially fixed curvalinear outer surface for sealed rotational engagement with the engine housing;
   rotor control means for regulating angular reciprocation of the rotors within the interior toroidal cavity to control a volume increase or decrease of at least six working chambers spaced between rotor blocks;
   a first heat exchanger in fluid communication with the interior cavity via the compressed gas outlet port for partially heating the working gas;
   a second heat exchanger thermally connected to the heat source and in fluid communication with the interior cavity via the heated gas inlet port for additional heating of the working gas;
   a third heat exchanger in fluid communication with the hot exhaust gas outlet port and thermally connected to the first heat exchanger for removing heat from the working gas and for supplying heat to the first heat exchanger; and
   a fourth heat exchanger in fluid communication with the exhaust gas exiting the third heat exchanger and in fluid communication with the cooled gas inlet port for removing waste heat from the working gas.

2. The Stirling cycle rotary engine as defined in claim 1, wherein the rotor control means comprises:
   a output shaft rotatable about a output shaft axis; and
   at least three pairs of elliptical gears for regulating rotational movement of the rotors within the toroidal cavity, each pair of elliptical gears including a rotor shaft gear fixedly mounted to a respective rotor shaft aligned with the central housing axis and an intermeshing output shaft gear fixedly mounted to the output shaft.

3. The Stirling cycle rotary engine as defined in claim 1, further comprising:
   a flow path for circulating the working gas in a closed loop serially interconnecting the toroidal cavity, the first heat exchanger, the second heat exchanger, the toroidal cavity, the third heat exchanger, the fourth heat exchanger and the toroidal cavity, respectively.

4. The Stirling cycle rotary engine as defined in claim 3, wherein:
   the flow path circulates the working gas from a first working chamber in the toroidal cavity to the first heat exchanger, and from the second heat exchanger to a second working chamber in the toroidal cavity isolated from the first working chamber by a rotor block.

5. The Stirling cycle rotary engine as defined in claim 1, wherein each of the rotor blocks comprises:
   front and rear planar, parallel side surfaces each perpendicular to the central housing axis and in sealed rotational engagement with the engine housing.

6. A Stirling cycle rotary engine as defined in claim 1, further comprising:
   a gas flow line isolated from the interior toroidal cavity for interconnecting the heated gas inlet port and the heated gas outlet port; and
   regulatable valve means in the gas flow line for controlling gas flow between the heated gas inlet port and the heated gas outlet port.

7. A Stirling cycle rotary engine as defined in claim 2, wherein:
   each of the elliptical gears is fixedly mounted to its respective shaft with a mass center of each gear aligned with a respective shaft axis.

8. A Stirling cycle rotary engine for producing mechanical energy from heat generated by a solar powered heat source, the engine comprising:
   an engine housing having an interior toroidal cavity with a central housing axis for receiving a working gas, the engine housing further having a cool gas inlet port, a compressed gas outlet port, a heated gas inlet port, and a heated gas outlet port;

at least three rotors each fixedly mounted to a respective rotor shaft and independently rotatable within the toroidal cavity about the central axis;

each of the rotors including a pair of rotor blocks spaced radially on diametrically opposing sides of the respective rotor shaft, each rotor block having a radially fixed outer surface for sealed rotational engagement with the engine housing;

an output shaft rotatable about a output shaft axis parallel with the central housing axis; at least three pairs of elliptical gears for regulating rotational movement of the rotors within the toroidal cavity, each pair of elliptical gears including a rotor shaft gear fixedly mounted to a respective rotor shaft and an intermeshing output shaft gear fixedly mounted to the output shaft;

a first heat exchanger in fluid communication with the interior cavity via the compressed gas outlet port for partially heating the working gas;

a second heat exchanger thermally connected to the heat source and in fluid communication with the interior cavity via the heated gas inlet port for additional heating of the working gas;

a third heat exchanger in fluid communication with the heated gas outlet port and thermally connected to the first heat exchanger for removing heat from the working gas and for supplying heat to the first heat exchanger; and a fourth heat exchanger in fluid communication with the cool gas inlet port and spaced in the flow path between the third heat exchanger and the toroidal cavity for removing excess heat from the working gas.

9. The Stirling cycle rotary engine as defined in claim 8, further comprising:

a flow path for circulating the working gas in a closed loop serially interconnecting the toroidal cavity, the first heat exchanger, the second heat exchanger, the toroidal cavity, the third heat exchanger, the fourth heat exchanger, respectively.

10. The Stirling cycle rotary engine as defined in claim 9, wherein:

the flow path circulates the working gas from a first working chamber in the toroidal cavity to the first heat exchanger, and from the second heat exchanger to a second working chamber in the toroidal cavity isolated from the first working chamber by a rotor block.

11. A Stirling cycle rotary engine as defined in claim 8. further comprising:

a gas flow line isolated from the interior toroidal cavity for interconnecting the heated gas inlet port and the heated gas outlet port; and regulatable valve means in the gas flow line for controlling gas flow between the heated gas inlet port and the heated gas outlet port.

12. A Stirling cycle rotary engine as defined in claim 8, wherein:

each of the elliptical gears is fixedly mounted to its respective shaft with a mass center of each gear aligned with a respective shaft axis.

13. A method of producing mechanical energy from heat generated by a heat source utilizing an engine including an engine housing having an interior toroidal cavity with a central housing axis, a plurality of rotors each fixedly mounted to a respective rotor shaft and independently rotatable within the toroidal cavity about the central axis, each of the rotors including a pair of rotor blocks spaced radially on diametrically opposing sides of the respective rotor shaft, and rotor control means for regulating angular reciprocation of the rotors within the interior toroidal cavity to control a volume increase or decrease in working chambers spaced between rotor blocks. the method comprising:

compressing a working gas in a first working chamber spaced between first and second rotor blocks;

passing the compressed working gas through a first heat exchanger for partially heating the compressed working gas;

passing the compressed working gas through a second heat exchanger thermally connected to the heat source for additional heating of the compressed working gas;

returning the heated compressed gas to a second working chamber spaced between the second and a third rotor block and isolated from the first working chamber;

rotating the third rotor block to expand the second working chamber volume and produce work in response to the expanded working gas;

passing the expanded working gas through a third heat exchanger thermally connected to the first heat exchanger for removing heat from the expanded working gas and for supplying heat to the first heat exchanger;

passing the expanded working gas through a fourth heat exchanger for removing excess heat from the expanded working gas before returning the working gas to the toroidal cavity; and returning the working gas from the fourth heat exchanger to the toroidal cavity.

14. A method as defined in claim 13, further comprising:

providing a gas flow line between the heated compressed gas from the second heat exchanger and the expanded working gas to the third heat exchanger and isolated from the interior toroidal cavity of the engine housing; and regulating gas flow in the gas flow line to control engine performance.

* * * * *